United States Patent [19]

Nozaki et al.

[11] 4,361,844

[45] Nov. 30, 1982

[54] RECORDING HEAD

[75] Inventors: Mineo Nozaki, Kawasaki; Osamu Asakura, Tokyo; Masasumi Nagashima, Yokosuka, all of Japan

[73] Assignee: Canon Kabushiki Kaisha, Tokyo, Japan

[21] Appl. No.: 273,438

[22] Filed: Jun. 15, 1981

[30] Foreign Application Priority Data

Jun. 26, 1980 [JP] Japan .................................. 55-87083

[51] Int. Cl.³ .............................................. H05B 1/00
[52] U.S. Cl. .................................. 346/76 PH; 219/216
[58] Field of Search .................... 346/76 R, 76 PH; 219/216, 216 PH

[56] References Cited

U.S. PATENT DOCUMENTS 3,700,852 10/1972 Ruggiero ............................. 219/216
3,967,092 6/1976 Conta et al. .......................... 219/216

OTHER PUBLICATIONS

IBM Technical Disclosure Bulletin Apr., 1980 vol. 22 No. 11 p. 5032.

*Primary Examiner*—Donald A. Griffin
*Attorney, Agent, or Firm*—Fitzpatrick, Cella, Harper & Scinto

[57] ABSTRACT

A recording head having plural recording elements, a printed circuit board connected to the plural recording elements for power supply thereto, a serial-in-parallel-out driver circuit provided on the printed circuit board for converting the signals to the recording elements into parallel signals, and electrodes provided on the printed circuit board for connection with an external connector.

10 Claims, 4 Drawing Figures

RECORDING HEAD

BACKGROUND OF THE INVENTION

1. Field of the Invention

The present invention relates to a detachable recording head for use in a recording apparatus, and more particularly to such a recording head with a reduced number of terminals.

2. Description of the Prior Art

The conventional interchangeable recording head requires an increased number of electric terminals with the increase in number of recording elements and a particularly large number of terminals in case of achieving a higher print quality, or of printing Japanese characters with dots. Japanese characters require at least a 16×16 dot matrix, and a 24×24 dot matrix for achieving a particular print style, for example Ming style, thus requiring at least 24 dots for the head even when the printing is achieved with vertical one-column dots.

FIG. 1 shows the structure of a conventional thermal head and a connector therefor, wherein there is provided a thermal head body 1 having 24 heating elements 1a arranged on a plane, a printed circuit board 2 having circuit patterns for power supply to said thermal head body 1, a heat sink 3 for holding and cooling said thermal head body 1, an angle member 4 for maintaining the thermal head body 1 in contact with the printed circuit board 2 and with the heat sink 3, and a connector 5 for detachably maintaining the heat sink and making electrical connections to said printed circuit board 2.

Such a thermal head, containing only the resistors constituting the heating elements, requires at least 25 terminals for the connector 5, i.e. 24 terminals for selecting dots and 1 common terminal. Such an increased number of terminals, requiring an arrangement in a plane, leads to a larger dimension of the thermal head unit or to a lowered reliability due to finer circuit patterns arranged in a higher density. Also the use of a flexible cable as the power supply to the moving thermal head results in a reduction in the supply voltage, causing a defective in the function of the thermal head sensitive to the voltage fluctuation.

SUMMARY OF THE INVENTION

The object of the present invention is to provide a recording head structured detachable from the connector and featured with a reduced number of terminals, thus improving the reliability and facilitating the manufacture of the recording head.

Another object of the present invention is to provide a recording head of an extremely simple structure with a reduced number of input terminals.

Still another object of the present invention is to provide a recording head which can be formed thin and compact with a simple structure.

DESCRIPTION OF THE PREFERRED EMBODIMENTS

Now the present invention will be clarified in detail by the embodiments thereof shown in the attached drawings.

Figure 1:
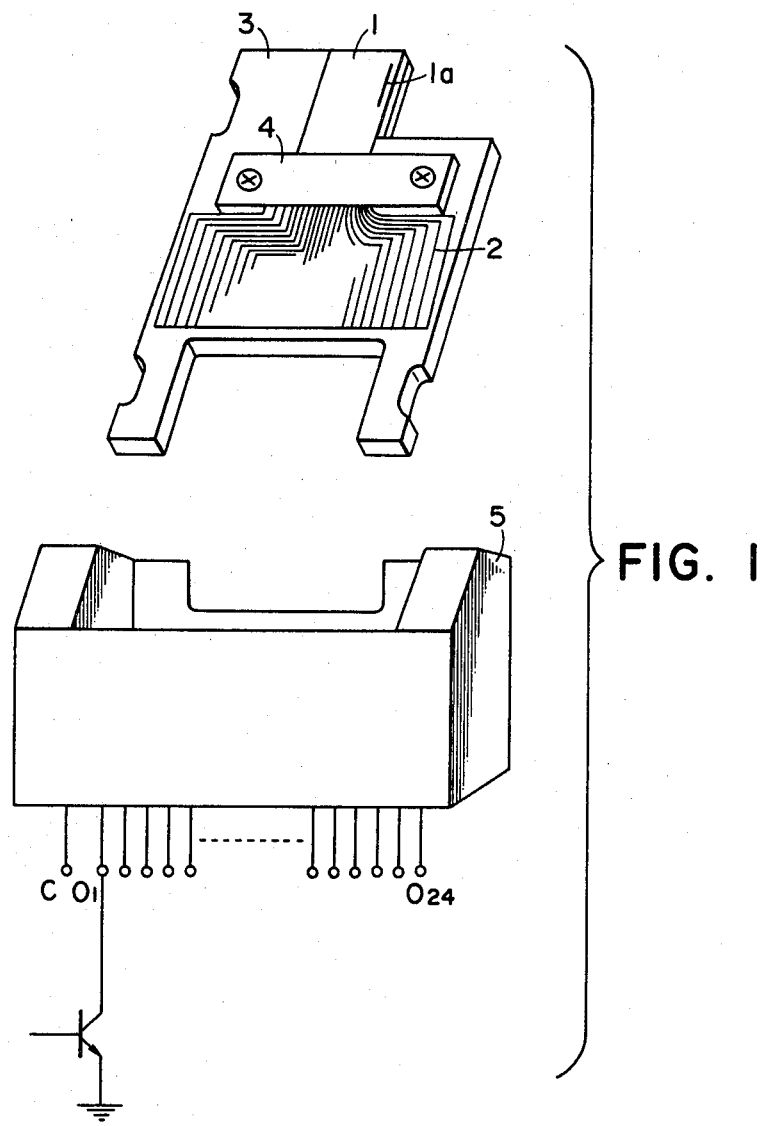
FIG. 1 is a perspective view of a conventional thermal head.
Figure 2A:
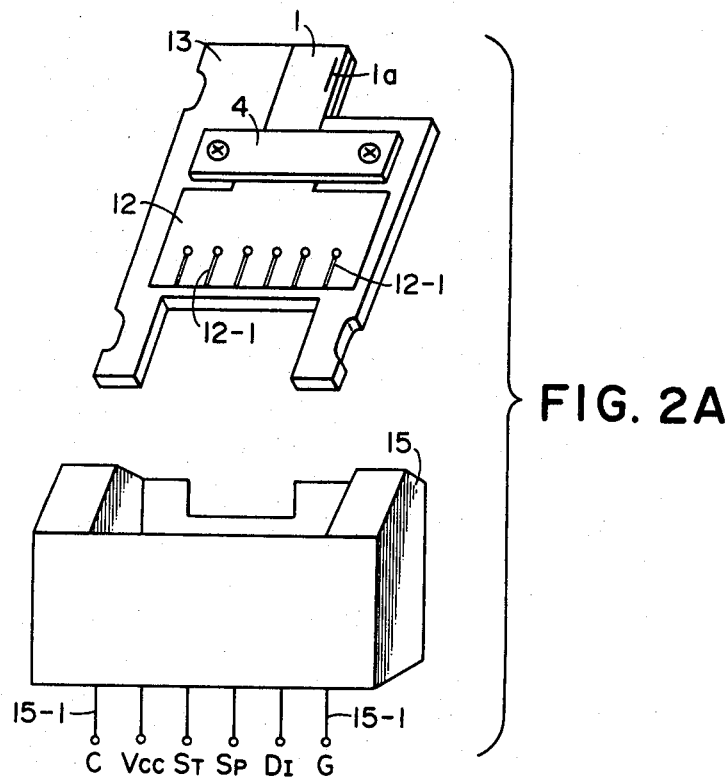
FIG. 2A is a perspective view of a thermal head embodying the present invention.
Figure 2B:
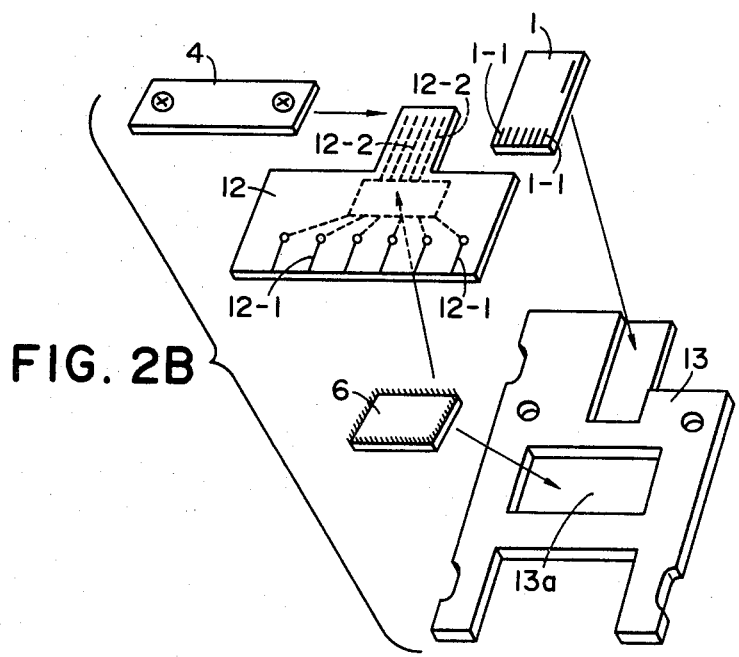
FIG. 2B is an exploded view of a thermal head embodying the present invention.

FIGS. 2A and 2B show a recording head embodying the present invention, wherein the parts of same which function as those in FIG. 1 are represented by same numbers. There is also shown the thermal head body 1, a printed circuit board 12 for power supply thereto, which is connected to an integrated circuit 6 having plurality of driver units and is provided with six input circuit patterns 12-1 to said integrated circuit 6 and twenty-four output circuit patterns 12-2 to said thermal head body 1. A head sink 13 composed of a metal such as aluminum is provided for holding and cooling the thermal head body 1, which is adhered, for example with an adhesive material, to said heat sink. Said heat sink is provided in the central portion thereof with a recess or an aperture 13a slightly larger than said integrated circuit 6, in such a manner that, when said printed circuit board 12 with the integrated circuit 6 fixed thereon is mounted on the head sink as shown in FIG. 2A, said integrated circuit 6 is accommodated in said recess 13a with a certain marginal area therearound. In this manner the integrated circuit 6 is protected by said head sink. The thermal head body 1 is provided along an end thereof with twenty-five terminals 1-1, which are superposed with the output circuit patterns 12-2 to make electrical connections therebetween as they are pressed together by an angle 4 fixed with screws to the heat sink. A connector 15 detachably holds the heat sink 13 and makes electrical connections to the printed circuit board 12. Said connector is provided with terminals 15-1 and unrepresented contacts electrically connected to said terminals, whereby, upon mounting of the recording head shown in FIG. 2A on the connector 15, the circuit patterns 12-1 are electrically connected with said terminals 15-1 through said unrepresented contacts. The integrated circuit 6 is mounted on the rear face of the printed circuit board 12 and is connected with said board 12 and the heating elements 1a for achieving control therefor.

Figure 3:
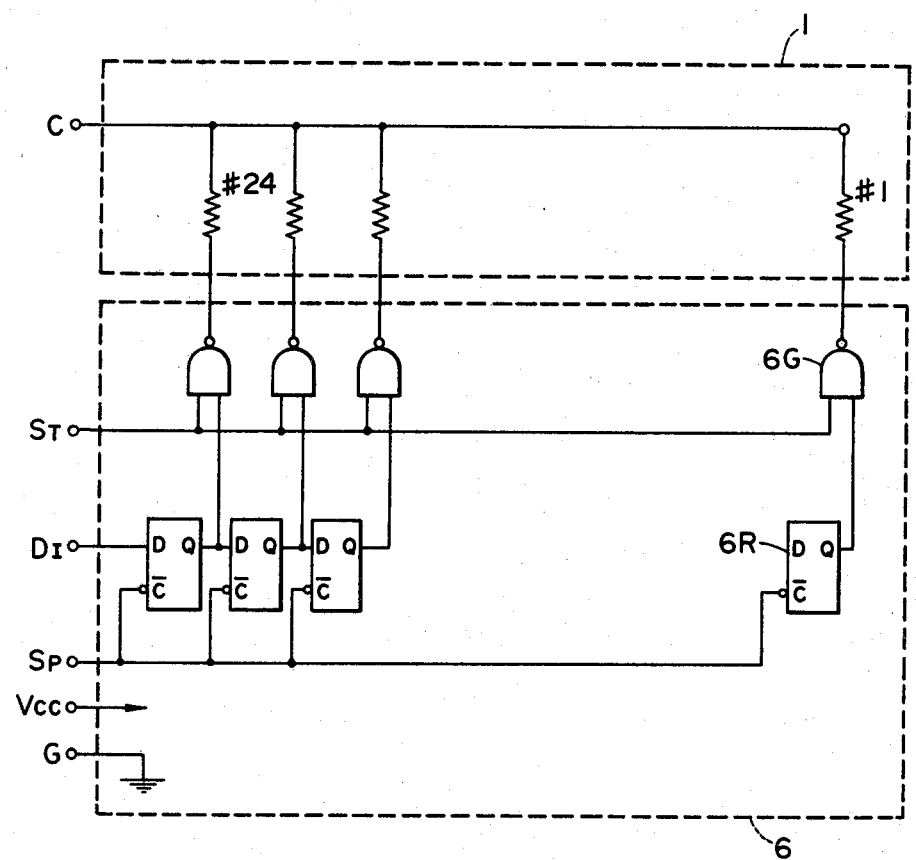
FIG. 3 is a circuit diagram of an intergrated circuit incorporated in the thermal head.

As shown in the circuit diagram of FIG. 3, said integrated circuit 6 constitutes a 24 bit serial-in-parallel-out driver composed of 24 registers 6R and gates 6G, wherein a driver unit for each heating element is composed of a register 6R and a gate 6G.

The print data (drive signals) are entered from a terminal D1 in succession starting from the signal corresponding to the heating element #1, and are shifted bit by bit in response to the shift pulses entered from a shift pulse terminal Sp. The data are serially entered in this manner to store the drive signal corresponding to the heating elements #1 to #24 in the registers 6R. Then in response to a strobe pulse entered from a terminal St, gates 6G are opened for the heating elements to be energized corresponding to the drive signals stored in said registers 6R, whereby currents are supplied to the heating elements connected to a common terminal C, thus generating heat therefrom. Upon termination of the strobe pulse the gates 6G are closed to cut off the currents to the heating elements which thus are cooled by heat radiation. During a period prior to the succeeding strobe pulse, the new data from #1 to #24 are serially entered from the terminal D1 and stored in the registers 6R.

In the present embodiment, therefore, by incorporating the serial-in-parallel-out driver 6 in the thermal head 1, the number of terminals of the connector 15 is reduced to only six, i.e. the data entry terminal D1, shift pulse terminal Sp for shifting the serially entered data in the registers 6G, strobe terminal St for determining the timing for power supply to the heating elements, common terminal C connected to all the heating elements, and terminals Vcc and G for driving the integrated circuit 6. Upon insertion of the thermal head into the connector 15, said six terminals drive the integrated circuit 6 through corresponding six circuit patterns on the printed circuit board 12.

The integrated circuit 6 has twenty-four output terminals corresponding to the number of heating elements, and is capable of achieving stable heat generation even through fine circuit patterns since the driver circuits are located close to the heating elements. Also the integrated circuit 6, being positioned in the heat sink, is resistant to heat generation leading to the destruction of the integrated circuit and is capable of enduring a large current caused by simultaneous power supply to the heating elements. Also the external protection provided by this structure prevents mechanical damage to the circuits.

As explained in the foregoing, the presence of the 24-bit serial-in-parallel-out driver 6 in the thermal head allows to reduce the number of terminals on the printed circuit board 12 and of connector 15 to only six, thus enabling significant compactness of the head without reducing the width of circuit patterns, and providing a significant improvement in the reliability since said terminals are used only for the transmission of control signals.

The present invention is not limited to the foregoing embodiment but allows further cost reduction if the drivers and heating elements are formed on a single silicon chip in a single-crystal type thermal head.

What we claim is:

1. A detachable recording head, comprising:
recording means having plural recording elements;
serial-parallel converting means provided with a parallel output unit for parallel supply of drive signals to said plural recording elements of said recording means and adapted to supply serially entered drive signals to said parallel output unit after conversion of said signals into parallel signals;
means for supplying drive signals given to the parallel output unit of said serial-parallel converting means to said recording elements of said recording means;
a terminal member electrically connected to said serial-parallel converting means for serial signal entry thereto, said terminal member being provided for connection with an external connector; and
a substrate for mounting said recording head, serial-parallel converting means, supply means and terminal member.

2. A detachable recording head according to claim 1, wherein said substrate is composed of a metal.

3. A detachable recording head according to claim 1, wherein said recording elements are composed of thermal recording elements.

4. A detachable recording head according to claim 1, wherein said serial-parallel converting means is provided with plural registers and plural gates.

5. A detachable recording head, comprising:
recording means having plural recording elements;
a circuit board provided with output terminals for parallel output of drive signals for driving said plural recording elements of said recording means and with input terminals for serial entry of said drive signals, said input terminal being provided for connection with an external connector;
converting means fixed on said circuit board for converting the drive signals serially entered from said input terminal into parallel signals; and
a substrate member for mounting said recording means and circuit board.

6. A detachable recording head according to claim 5, further comprising pressure contacting means for maintaining said circuit board and recording means in pressure contact.

7. A detachable recording head according to claim 5, wherein said input terminals on said circuit board comprise at least a terminal for entering serial drive signals, a terminal for entering shift pulses and a terminal for entering a strobe signal.

8. A detachable recording head, comprising:
recording means having plural recording elements;
converting means for converting serially entered signals into parallel drive signals for supply to said plural recording elements;
a circuit board supporting said converting means thereon and provided with a signal input unit for receiving serial drive signals for supply to said converting means and said with a signal output unit for releasing parallel drive signals for supply to said recording means; and
a substrate for mounting said recording means and circuit board, said substrate being provided with a recess for accommodating said converting means and adapted to fixedly support said circuit board in a state wherein said converting means is housed in said recess.

9. A detachable recording head according to claim 8, wherein said substrate is composed of a metal.

10. A detachable recording head according to claim 8, wherein said recess in said substrate constitutes an aperture therein.

* * * * *